United States Patent
Furuta et al.

(10) Patent No.: US 12,275,217 B2
(45) Date of Patent: Apr. 15, 2025

(54) DECORATIVE SHEET AND DECORATIVE MATERIAL USING SAME

(71) Applicant: DAI NIPPON PRINTING CO., LTD., Tokyo (JP)

(72) Inventors: Satoshi Furuta, Asaka (JP); Osamu Goto, Yoshikawa (JP); Toshiyuki Sakai, Tsukuba (JP); Mayuko Komurasaki, Misato (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 479 days.

(21) Appl. No.: 17/762,465

(22) PCT Filed: Sep. 23, 2020

(86) PCT No.: PCT/JP2020/035790
§ 371 (c)(1),
(2) Date: Mar. 22, 2022

(87) PCT Pub. No.: WO2021/065620
PCT Pub. Date: Apr. 8, 2021

(65) Prior Publication Data
US 2022/0347983 A1    Nov. 3, 2022

(30) Foreign Application Priority Data

Sep. 30, 2019    (JP) .................. 2019-180105

(51) Int. Cl.
*B32B 27/08*    (2006.01)
*B32B 3/30*    (2006.01)
(Continued)

(52) U.S. Cl.
CPC ............ *B32B 27/08* (2013.01); *B32B 3/30* (2013.01); *B32B 7/12* (2013.01); *B32B 27/16* (2013.01);
(Continued)

(58) Field of Classification Search
None
See application file for complete search history.

(56) References Cited

FOREIGN PATENT DOCUMENTS

| JP | S58-14312 B2 | 3/1983 |
|---|---|---|
| JP | 2007-30276 A | 2/2007 |

(Continued)

OTHER PUBLICATIONS

Nov. 24, 2020 International Search Report issued in International Patent Application No. PCT/JP2020/035790.
(Continued)

*Primary Examiner* — Jeffrey D Washville
(74) *Attorney, Agent, or Firm* — Oliff PLC

(57) ABSTRACT

A decorative sheet having a surface protective layer on substrate, wherein the surface protective layer is obtained by crosslinking and curing composition A containing an ionizing radiation-curable resin composition and radical scavenger; the radical scavenger contains radical scavenger i which includes ethylenic double bond polymerizable with ionizing radiation-curable resin composition and radical scavenger ii which does not include ethylenic double bond polymerizable with ionizing radiation-curable resin composition; a content of radical scavenger in composition A is not less than 0.5 parts by mass and less than 10.0 parts by mass based on 100 parts by mass of the ionizing radiation-curable resin composition; and a water vapor transmission rate of the decorative sheet when measured in accordance with Testing Methods for Determination of the Water Vapor Transmission Rate of Moisture-Proof Packaging Materials (Dish Method) defined in JIS Z0208:1976 is not less than 0.75 g/m²·24 h and not more than 45 g/m²·24 h.

14 Claims, 1 Drawing Sheet

(51) Int. Cl.
   *B32B 7/12*     (2006.01)
   *B32B 27/16*    (2006.01)
   *B32B 27/20*    (2006.01)
   *B32B 27/32*    (2006.01)
   *C09D 175/16*   (2006.01)

(52) U.S. Cl.
   CPC .............. *B32B 27/20* (2013.01); *B32B 27/32* (2013.01); *C09D 175/16* (2013.01); *B32B 2255/10* (2013.01); *B32B 2255/26* (2013.01); *B32B 2264/1022* (2020.08); *B32B 2307/584* (2013.01); *B32B 2307/7246* (2013.01); *B32B 2307/732* (2013.01); *B32B 2451/00* (2013.01)

(56) References Cited

FOREIGN PATENT DOCUMENTS

| | | |
|---|---|---|
| JP | 2011-207183 A | 10/2011 |
| JP | 2012-206375 A | 10/2012 |
| JP | 2012-206376 A | 10/2012 |
| JP | 2014-15537 A  | 1/2014 |
| JP | 2018-171920 A | 11/2018 |
| JP | 2019-181933 A | 10/2019 |

OTHER PUBLICATIONS

Nov. 24, 2020 Written Opinion issued in International Patent Application No. PCT/JP2020/035790.

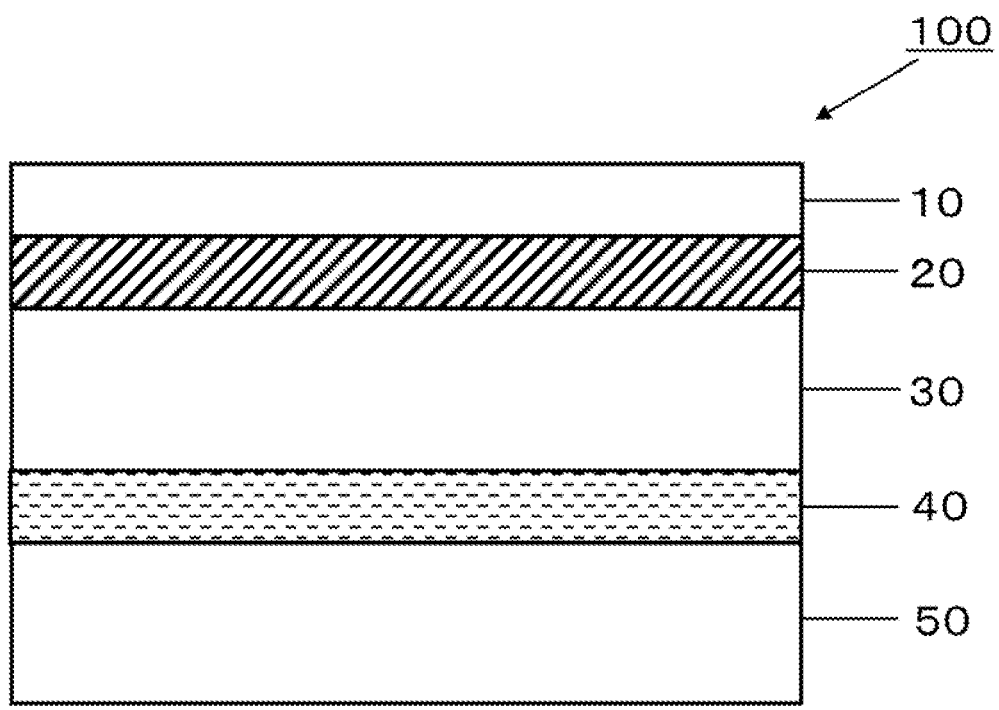

DECORATIVE SHEET AND DECORATIVE MATERIAL USING SAME

TECHNICAL FIELD

The present invention relates to a decorative sheet and to a decorative material using the sheet.

BACKGROUND ART

Decorative sheets have been used to decorate and protect the surface of an interior member and an exterior member of an architectural structure, an interior member and an exterior member of a vehicle such as an automobile, furniture, a fixture member, and a home appliance, etc. Decorative sheets are composed of, for example, a surface protective layer disposed on a substrate.

When these decorative sheets are used outdoor or used at a place exposed to sunlight such as a windowside even in a room, a change in color and the degradation of a resin are induced by the impacts of ultraviolet. For this reason, a decorative sheet to which a radical scavenger and the like are added to a surface protective layer is proposed for the purpose of enhancing the weatherability.

However, a radical scavenger poses a problem of easily bleeding out of a surface protective layer over time. "Bleeding out" is also referred to as "bleed out" or "migration." When a radical scavenger bleeds out, a decent appearance of the decorative sheet surface is impaired and the concentration of the radical scavenger in the surface protective layer decreases over time, raising a problem of insufficient weatherability.

The decorative sheet of PTL 1, for example, is proposed for solving the issue of bleeding out of a radical scavenger.

The decorative material used for members, etc. of the above intended uses includes a plastic product or the like using a decorative sheet having, for example, a polyvinyl chloride sheet as the substrate and a decorative layer, a surface protective layer and the like are optionally provided as decoration treatment (see, for example, PTL 2).

CITATION LIST

Patent Literature

PTL 1: JP 2012-206375A
PTL 2: JP 58-14312B

DISCLOSURE OF INVENTION

Technical Problem

The decorative sheet of PTL 1 has a surface protective layer in which a hindered amine light stabilizer (radical scavenger) has a reactive functional group, and thus the hindered amine light stabilizer is fixed in the surface protective layer and inhibits the bleed out.

However, while inhibiting the hindered amine light stabilizer from bleeding out, the decorative sheet of PTL 1 fails to sufficiently scavenge radicals generated by the ultraviolet irradiation and degrades the decorative sheet over time causing the weatherability to be not fully satisfied. The decorative sheet of PTL 1 also had a problem of decreasing the scratch resistance of the surface protective layer due to a decreased crosslinking density of an ionizing radiation-curable resin composition.

When the decorative sheets or the like of the above PTLs 1 and 2 are attached to an adherend to produce a decorative material, an insufficient initial tight contact strength may raise the problem of causing the delamination at an end surface of the decorative sheet so-called springback. A decorative sheet causing the springback has inadequate application suitability.

On the other hand, when a decorative material produced by attaching the above decorative sheet to an adherend has been used, the problems arose that caused degradation of the substrate constituting the decorative sheet provided on the outermost surface due to the impacts from moisture in the atmosphere, wind and rain, and further ultraviolet by the solar radiation and that delaminated the decorative sheet from the adherent caused by the degradation of an adhesive for adhesion of the decorative sheet to the adherent.

It is an object of the present invention to provide a decorative sheet which can achieve good weatherability and inhibit the decrease of scratch resistance of the surface protective layer, as well as which has excellent application suitability with a high initial tight contact strength in the application process, and achieves the excellent long-term adhesion free from the delamination even when used for a long term, and to provide a decorative material.

Solution to Problem

The present invention provides the following [1] and [2] to achieve the above object.

[1] A decorative sheet including a surface protective layer on a substrate, wherein the surface protective layer is a layer obtained by crosslinking and curing a composition A containing an ionizing radiation-curable resin composition and a radical scavenger; the radical scavenger contains a radical scavenger i which includes an ethylenic double bond polymerizable with the ionizing radiation-curable resin composition and a radical scavenger ii which does not include an ethylenic double bond polymerizable with the ionizing radiation-curable resin composition; a content of the radical scavenger in the composition A is not less than 0.5 parts by mass and less than 10.0 parts by mass based on 100 parts by mass of the ionizing radiation-curable resin composition; and a water vapor transmission rate of the decorative sheet when measured in accordance with Testing Methods for Determination of the Water Vapor Transmission Rate of Moisture-Proof Packaging Materials (Dish Method) defined in JIS Z0208:1976 is not less than 0.75 g/m$^2$·24 h and not more than 45 g/m$^2$·24 h.

[2] A decorative material including an adherend and the decorative sheet as described in the above [1].

Advantageous Effect of Invention

According to the present invention, it is possible to provide a decorative sheet which can achieve good weatherability and inhibit the decrease of scratch resistance of the surface protective layer, as well as which has excellent application suitability with a high initial tight contact strength in the application process, and achieves the excellent long-term adhesion free from the delamination even when used for a long term, and to provide a decorative material.

BRIEF DESCRIPTION OF DRAWINGS

FIG. 1 is a cross-sectional view illustrating an embodiment of a decorative sheet according to the present invention.

DESCRIPTION OF EMBODIMENTS

[Decorative Sheet]

The decorative sheet of the present invention is described below. In the present Description, the numerical values according to "not less than" and "not more than" pertaining to the descriptions of numerical ranges are numerical values that can be in any combinations, and the numerical values in Examples can be used for the upper limit and the lower limit of a numerical value range.

The decorative sheet of the present invention comprises a surface protective layer on a substrate, wherein the surface protective layer is a layer obtained by crosslinking and curing a composition A containing an ionizing radiation-curable resin composition and a radical scavenger; the radical scavenger contains a radical scavenger i which includes an ethylenic double bond polymerizable with the ionizing radiation-curable resin composition and a radical scavenger ii which does not include an ethylenic double bond polymerizable with the ionizing radiation-curable resin composition; a content of the radical scavenger in the composition A is not less than 0.5 parts by mass and less than 10.0 parts by mass based on 100 parts by mass of the ionizing radiation-curable resin composition; and a water vapor transmission rate of the decorative sheet when measured in accordance with Testing Methods for Determination of the Water Vapor Transmission Rate of Moisture-Proof Packaging Materials (Dish Method) defined in JIS Z0208:1976 is not less than 0.75 $g/m^2 \cdot 24$ h and not more than 45 $g/m^2 \cdot 24$ h.

<Water Vapor Transmission Rate>

The decorative sheet of the present invention has a water vapor transmission rate of not less than 0.75 $g/m^2 \cdot 24$ h and not more than 45 $g/m^2 \cdot 24$ h when measured in accordance with Testing Methods for Determination of the Water Vapor Transmission Rate of Moisture-Proof Packaging Materials (Dish Method) defined in JIS Z0208:1976.

The decorative sheet of the present invention achieves a high initial tight contact strength in the application process thereof when a water vapor transmission rate is in a particular range. It is therefore possible for the decorative sheet of the present invention to prevent the delamination at an end surface thereof during the application due to an insufficient initial tight contact strength, so-called springback, and thus the application efficiency can be enhanced. On the other hand, in the case of forming a decorative member using the decorative sheet and an adherend via an adhesive layer, the degradation of the adhesive layer between the decorative sheet and the adherend can be mainly prevented. Consequently, the delamination caused by such a degradation of the adhesive layer is prevented to thus achieve the excellent long-term adhesion free from the delamination even when used for a long term. Thus, the water vapor transmission rate of the decorative sheet of the present invention being in a particular range enables the compatibility between the excellent application suitability due to a high initial tight contact strength in the application process and the long-term adhesion free from the delamination even when used for a long term.

The decorative sheet of the present invention has a water vapor transmission rate of not less than 0.75 $g/m^2 \cdot 24$ h and not more than 45 $g/m^2 \cdot 24$ h. When a water vapor transmission rate is less than 0.75 $g/m^2 \cdot 24$ h, an adhesion failure caused by insufficient curing of an adhesive used in an adhesive layer is liable to occur during the formation of a decorative material by attaching the decorative sheet to the adherend via the adhesive layer. Consequently, an excellent initial adhesive strength cannot be obtained, failing to obtain the excellent application suitability. On the other hand, when a water vapor transmission rate is more than 45 $g/m^2 \cdot 24$ h, the degradation of a substrate and the hydrolysis of an adhesive used in the adhesive layer are caused in long-term use due to the impacts from moisture in the atmosphere, wind and rain, and further ultraviolet by the solar radiation, likely leading to the delamination between the decorative sheet and the adherend, failing to obtain the long-term adhesion free from the delamination even when used for a long term. Thus, as already described, when the decorative sheet of the present invention has a water vapor transmission rate in a particular range, the excellent application suitability due to a high initial tight contact strength in the application process and the long-term adhesion free from the delamination even when used for a long term can be compatible.

In order to enhance the long-term adhesion and the application suitability, the water vapor transmission rate is not less than 1.2 $g/m^2 \cdot 24$ h, more preferably not less than 1.5 $g/m^2 \cdot 24$ h, even more preferably not less than 2.5 $g/m^2 \cdot 24$ h, and even furthermore preferably not less than 4.5 $g/m^2 \cdot 24$ h, and the upper limit is preferably 40 $g/m^2 \cdot 24$ h or less, more preferably 35 $g/m^2 \cdot 24$ h or less, even more preferably 30 $g/m^2 \cdot 24$ h or less, and even furthermore preferably 20 $g/m^2 \cdot 24$ h or less.

In the present invention, the water vapor transmission rate can be mainly adjusted by the type of a material constituting the below-described substrate, and in the case of having a transparent resin layer, the type of a material constituting the transparent resin layer.

FIG. 1 is a cross-sectional view illustrating a representative embodiment of a decorative sheet 100 according to the present invention. The decorative sheet 100 of FIG. 1 has a surface protective layer 10 on a substrate 50. The decorative sheet 100 of FIG. 1 has a primer layer 20 in contact with the surface at the substrate 50 side of the surface protective layer 10. The decorative sheet 100 of FIG. 1 further has a transparent resin layer 30 and a decorative layer 40 between the substrate 50 and the surface protective layer 10.

Each layer constituting the decorative sheet of the present invention is described below in greater detail.

<Substrate>

Films, sheets, and plates made of materials such as various papers, a plastic, a metal, a woven fabric or a non-woven fabric, a wood member, and a ceramic material can be used as the substrate.

Flat-shape substrates having a predetermined thickness are generally distinguished and referred as film, sheet, and plate in order of thinness in thickness. However, there is no particular need to distinguish the thickness difference in the present invention, and therefore these different terms are considered as appropriately exchangeable with no particular essential differences in the present Description. These different terms (different thicknesses) do not cause different interpretations in Claims of the present invention.

Among these, a plastic, despite its insufficient weatherability, can achieve good weatherability of the decorative sheet as a whole due to the below-described surface protective layer, and is hence preferred.

Specific examples of resins constituting the plastic include polyolefin resins such as polyethylene and polypropylene, vinyl resins such as a vinyl chloride resin, a vinylidene chloride resin, polyvinyl alcohol, and an ethylene-vinyl alcohol copolymer, polyester resins such as polyethylene terephthalate and polybutylene terephthalate, acrylic resins such as polymethyl methacrylate, polymethyl acrylate, and polyethyl methacrylate, polystyrene, an acrylonitrile-butadiene-styrene copolymer (ABS resin), cellulose triacetate, and polycarbonate. Among these, a polyolefin resin, a vinyl chloride resin, a polyester resin, and an acrylic resin are preferred from the viewpoints of various physical properties such as weatherability and water resistance, printability, molding processing suitability, and price.

In view of easily adjusting the water vapor transmission rate of the decorative sheet of the present invention to be within the above range, as well as versatility, and usability as a decorative material and enhancing the application suitability and the long-term adhesion, a polyolefin resin and a vinyl chloride resin are more preferred among the above. In view of the environmental performance, a polyolefin resin is even more preferred. In the present invention, the above resins can be used singly or in a combination of two or more. In the case of combining two or more, substrates composed of respective single resin can be combined, or two or more resins are mixed to use as a single substrate.

Examples of polyolefin resins include, more specifically, olefin homopolymers such as ethylene, propylene, and butane; various copolymers such as a block copolymer or random copolymer of ethylene-propylene; copolymers of at least one of ethylene and propylene and at least one of other olefins such as butane, pentane, and hexane; and copolymers of at least one of ethylene and propylene and at least one of other monomers such as vinyl acetate and vinyl alcohol.

In order to easily adjust the water vapor transmission rate to the above range and also enhance the long-term adhesion and the application suitability, a polyethylene resin containing ethylene as the constituent unit and a polypropylene resin containing propylene as the constituent unit are preferred among the above, and a polypropylene resin is preferred.

The water vapor transmission rate is easily and reliably adjusted by adjusting the thickness of the layers such as the substrate and the transparent resin layer in which resins are used, hence preferred. In order to adjust the water vapor transmission rate of the decorative sheet of the present invention to the above predetermined range, it is preferred that the thicknesses of the substrate and the transparent resin layer be in predetermined ranges depending on materials, preferably the type of resins, constituting these layers, in view of thickness ratios accounting for the total thickness of the decorative sheet in the laminate structure of the decorative sheet.

For easily adjusting the water vapor transmission rate of the decorative sheet to be within the above predetermined range, the thickness of the substrate, when using a polyethylene resin, a polypropylene resin, and a vinyl chloride resin, may be preferably selected from a range of not less than 40 μm and not more than 200 μm, in view of the laminate structure of the decorative sheet and an intended water vapor transmission rate.

The polyethylene resin may be, more specifically, an ethylene homopolymer, thus, polyethylene, or may be a copolymer of ethylene and other comonomers copolymerizable with ethylene (e.g. α-olefins such as propylene, 1-butene, 1-hexane, and 1-octane, vinyl acetate, and vinyl alcohol). Examples of polyethylenes include high-density polyethylene (HDPE), medium-density polyethylene (MDPE), low-density polyethylene (LDPE), linear low-density polyethylene (LLDPE), very low-density polyethylene (VLDPE), ultra-high molecular weight polyethylene (UHMWPE), and crosslinked polyethylene (PEX). These polyethylene resins can be used singly or in a combination of two or more.

The polypropylene resin may be a propylene homopolymer, thus, polypropylene, or may be a copolymer of propylene and other comonomers copolymerizable with propylene (e.g. α-olefins such as ethylene, 1-butene, 1-hexane, and 1-octane; vinyl acetate, and vinyl alcohol). These polypropylene can be used singly or in a combination of two or more.

When a propylene homopolymer (polypropylene) is used, a controlled degree of crystallinity can adjust the water vapor transmission rate of the substrate. Generally, the higher a degree of crystallinity, the lower a water vapor transmission rate of the polypropylene resin tends to be. When a polypropylene resin having a thickness in the above range from not less than 40 μm and not more than 200 μm is used as the substrate, the degree of crystallinity thereof is preferably not less than 30%, and more preferably not less than 40%, and the upper limit is preferably 80% or less, and more preferably 70% or less.

Additionally, when a propylene homopolymer (polypropylene) is used, a controlled mass ratio of isotactic polypropylene to atactic polypropylene can also adjust the water vapor transmission rate of the substrate. Generally, when compared with the case where the percentage of the atactic polypropylene in the polypropylene is 100% by mass, the water vapor transmission rate of the substrate can be reduced by adding isotactic polypropylene. In this case, the mass ratio of atactic polypropylene to isotactic polypropylene is preferably 0/100 to 20/80 in view of easily adjusting the water vapor transmission rate.

When a vinyl chloride resin is used, the vinyl chloride resin can be a homopolymer of a vinyl chloride monomer, thus, polyvinyl chloride, or can be a copolymer obtained by copolymerizing a vinyl chloride monomer with a monomer copolymerizable with the vinyl chloride monomer.

Examples of monomers copolymerizable with a vinyl chloride monomer include vinyl esters such as vinyl acetate and vinyl propionate; acrylates such as methyl acrylate and butyl acrylate; methacrylates such as methyl methacrylate and ethyl methacrylate; maleates such as butyl maleate and diethyl maleate; fumarates such as dibutyl fumarate and diethyl fumarate; vinyl ethers such as vinyl methyl ether, vinyl butyl ether, and vinyl octyl ether; vinyl cyanides such as acrylonitrile and methacrylonitrile; olefins such as ethylene, propylene, butylene, and styrene; dienes such as isoprene and butadiene; vinylidene halides and vinyl halides other than vinyl chlorides such as vinylidene chloride and vinyl bromide; and allyl phthalates such as diallyl phthalate. These monomers can be used singly or in a combination of two or more.

The average degree of polymerization of a vinyl chloride resin is preferably not less than 500 and not more than 4000, more preferably not less than 700 and not more than 3900, and even more preferably not less than 1000 and not more than 3800, in order to easily adjusting the water vapor transmission rate to be within the above range and enhancing the long-term adhesion and the application suitability. When an average degree of polymerization is in the above range, excellent mechanical strengths and formability can be obtained. In the present Description, an average degree of polymerization is the average degree of polymerization measured in accordance with JIS K6721.

In the present embodiment, when a vinyl chloride resin is used, it is preferred to add a plasticizer for easily adjusting the water vapor transmission rate to be within the above range, enhancing the long-term adhesion and the application suitability, and also enhancing the processing properties.

There is no particular limitation on the plasticizer as long as it is compatible with a vinyl chloride resin, and examples include phthalate plasticizers such as dibutyl phthalate (DBP), dioctyl phthalate (DOP), diisononyl phthalate (DINP), diisodecyl phthalate (DIDP), and diundecyl phthalate (DUP); adipate plasticizers such as dibutyl adipate; phosphate plasticizers such as tributyl phosphate, tricresyl phosphate, and triphenyl phosphate; trimellitate plasticizers such as tributyl trimellitate and trioctyl trimellitate; known various polyester plasticizers such as adipate polyesters; and citrates such as acetyl tributyl citrate and acetyl trioctyl citrate. Among them, phthalate plasticizers, adipate plasticizers, and polyester plasticizers are preferred for easily adjusting the water vapor transmission rate to be within the above range, enhancing the long-term adhesion and the application suitability, and also enhancing the processing properties, and phthalate plasticizers and polyester plasticizers are more preferred. These plasticizers can be used singly or in a combination of two or more.

The content of a plasticizer may be appropriately adjusted depending on an intended water vapor transmission rate but generally, not unconditionally, as an additive for a plasticizer is increased, a water vapor transmission rate of a vinyl chloride resin tends to increase. In view of this point, the content of a plasticizer based on 100 parts by mass of a vinyl chloride resin is preferably not less than 15 parts by mass, more preferably not less than 20 parts by mass, and even more preferably not less than 25 parts by mass, and the upper limit is preferably 50 parts by mass or less, more preferably 45 parts by mass or less, and even more preferably 35 parts by mass or less. When a content of the plasticizer is within the above range, the water vapor transmission rate can be easily adjusted to be within an intended range and the long-term adhesion and the application suitability can be enhanced. When a content of the plasticizer is not less than 20 parts by mass, a vinyl chloride resin can be flexible and the processing properties can be enhanced. On the other hand, when a content of the plasticizer is not more than 50 parts by mass, the plasticizer can be prevented from bleeding out, the water vapor transmission rate is easily adjusted to an intended range with stability, and the long-term adhesion and the application suitability can be enhanced.

Especially, when a phthalate plasticizer is used to easily adjust the water vapor transmission rate to an intended range and enhance the long-term adhesion and the application suitability, the content thereof based on 100 parts by mass of a vinyl chloride resin is preferably not less than 25 parts by mass, more preferably not less than 30 parts by mass, and even more preferably not less than 35 parts by mass, and the upper limit is preferably 50 parts by mass or less, more preferably 45 parts by mass or less, and even more preferably 40 parts by mass or less. When a polyester plasticizer is used, the content thereof based on 100 parts by mass of a vinyl chloride resin is preferably not less than 15 parts by mass, more preferably not less than 18 parts by mass, and even more preferably not less than 20 parts by mass, and the upper limit is preferably 35 parts by mass or less, more preferably 30 parts by mass or less, and even more preferably 25 parts by mass or less.

The substrate may be colorless and transparent, or may be colored to enhance the design.

When the substrate is colored, a colorant such as a dye and a pigment can be added to the substrate. Among these colorants, pigments that easily inhibit color fading are preferred.

Examples of pigments include white pigments such as zinc oxide, white lead, lithopone, titanium dioxide (titanium white), precipitating barium sulfate, and barite; black pigments such as carbon black, azomethine azo black pigments, and perylene black pigment; red pigments such as red lead, red iron oxide, quinacridone red, and polyazo red; yellow pigments such as chrome yellow, zinc yellow (zinc yellow 1, zinc yellow 2), isoindolinone yellow, nickel-azo complex; and blue pigments such as ultramarine blue, Prussian blue (potassium ferrocyanide).

Titanium dioxide is a preferred pigment to be added to the substrate for its high masking performance and being less susceptible to a shade of the adherend. However, titanium dioxide generates radicals by light irradiation including ultraviolet spectrum, leading to a decrease in the weatherability of the decorative sheet. When titanium oxides of the rutile type and the brookite type are used, the radical generation can be reduced but radicals are still generated more than when no titanium dioxide is contained. However, in the present invention, even when the substrate containing a titanium dioxide is used, good weatherability is achieved for a long term because the surface protective layer contains a radical scavenger i and a radical scavenger ii. Particularly, when a substrate containing a titanium dioxide is used, it is preferred that the substrate and the surface protective layer be in contact (when a primer layer is included, it is preferred that the substrate and the primer layer be in contact).

There is no particular limitation on the thickness of the substrate but is, when the substrate is a plastic film or sheet, not less than 20 μm and the upper limit is preferably 3200 μm or less, more preferably not less than 40 μm as described above and the upper limit is more preferably 200 μm or less, and even more preferably 100 μm or less, in view of easily adjusting the water vapor transmission rate of the decorative sheet to be within the above predetermined range. When the substrate is papers, the basis weight is generally preferably not less than 20 g/m$^2$ and not more than 150 g/m$^2$, and not less than 30 g/m$^2$ and not more than 100 g/m$^2$.

The shape of the substrate is not limited to a flat plate but may be a special shape such as a three-dimensional shape.

One or both surfaces of the substrate may be subjected to easy adhesion treatment such as a physical treatment or a chemical surface treatment to enhance the adhesion between the layers provided on the substrate.

In order to enhance the adhesion between the substrate and another layer(s) of the decorative sheet or the adherend, one or both surfaces of the substrate may be subjected to surface treatment such as a physical surface treatment or a chemical surface treatment, e.g. by an oxidation method or a surface roughening method, or may be provided with a primer layer(s).

<Surface Protective Layer>

The surface protective layer of the decorative sheet of the present invention is a layer obtained by crosslinking and curing a composition A containing an ionizing radiation-curable resin composition and a radical scavenger.

<<Ionizing Radiation-Curable Resin Composition>>

The surface protective layer contains a cured product of an ionizing radiation-curable resin composition. When the surface protective layer contains a crosslinked cured product of the ionizing radiation-curable resin composition, the decorative sheet can achieve good scratch resistance. A part of the crosslinked cured product of the ionizing radiation-curable resin composition is polymerized with the below-described radical scavenger i.

Examples of the ionizing radiation-curable resin composition include an electron-beam curable resin composition and an ultraviolet curable resin composition. Among these, an electron-beam curable resin composition is preferred on the grounds that it can be coated solvent free and thus has small environmental burden, and a polymerization initiator is not needed. When the composition A contains the below-described ultraviolet absorber, an electron-beam curable resin composition easily gives a higher crosslinking density of the surface protective layer and is hence preferred.

The ionizing radiation-curable resin composition is a composition containing a compound having an ionizing radiation-curable functional group (hereinafter also referred to as the "ionizing radiation-curable compound"). The ionizing radiation-curable functional group herein refers to a group capable of being crosslinked and cured upon irradiation with ionizing radiation. A functional group having an ethylenic double bond, such as a (meth)acryloyl group, a vinyl group or an allyl group, is an exemplary preferable ionizing radiation-curable functional group. In the present Description, the (meth)acryloyl group refers to an acryloyl group or a methacryloyl group. In the present Description, the (meth)acrylate refers to acrylate or methacrylate.

The ionizing radiation refers to electromagnetic radiation or charged particle radiation having an energy quantum that can polymerize and/or crosslink molecules. While ultraviolet (UV) radiation or electron beam (EB) radiation is generally used, electromagnetic radiation, such as an X-ray radiation or γ-ray radiation, or charged particle radiation, such as an α-ray radiation or ion beam radiation, may also be used.

A specific ionizing radiation-curable compound to be used can be appropriately selected from among polymerizable monomers and polymerizable oligomers which are conventionally used as ionizing radiation-curable resins.

A (meth)acrylate monomer having a radical-polymerizable unsaturated group in the molecule, in particular a polyfunctional (meth)acrylate monomer, is preferably used as a polymerizable monomer. As used herein, "(meth)acrylate" refers to "acrylate or methacrylate".

The polyfunctional (meth)acrylate monomer can be exemplified by a (meth)acrylate monomer having 2 or more ionizing radiation-curable functional groups in the molecule and having at least a (meth)acryloyl group as the functional group.

In order to enhance the processing characteristics, the scratch resistance, and the weatherability, the number of the functional groups of the polyfunctional (meth)acrylate monomer is preferably not less than 2 and not more than 8, more preferably not less than 2 and not more than 6, even more preferably not less than 2 and not more than 4, and even furthermore preferably not less than 2 and not more than 3. These polyfunctional (meth)acrylate monomers may be used singly or in a combination of two or more.

The polymerizable oligomer can be exemplified by a (meth)acrylate oligomer having 2 or more ionizing radiation-curable functional groups in the molecule and having at least a (meth)acryloyl group as the functional group. Examples of the (meth)acrylate oligomer include a urethane (meth)acrylate oligomer, an epoxy (meth)acrylate oligomer, a polyester (meth)acrylate oligomer, a polyether (meth)acrylate oligomer, a polycarbonate (meth)acrylate oligomer, and an acrylic (meth)acrylate oligomer.

Examples of the polymerizable oligomer further include a highly hydrophobic polybutadiene (meth)acrylate oligomer having a (meth)acrylate group in a side chain of a polybutadiene oligomer, a silicone (meth)acrylate oligomer having a polysiloxane bond in the main chain; an aminoplast resin (meth)acrylate oligomer obtained by modifying an aminoplast resin having a number of reactive groups in the small molecule, and an oligomer having a cation-polymerizable functional group in the molecule such as a novolak epoxy resin, a bisphenol epoxy resin, an aliphatic vinyl ether, an aromatic vinyl ether, and the like.

These polymerizable oligomers may be used singly or in a combination of two or more. In order to enhance the processing characteristics, the scratch resistance, and the weatherability, a urethane (meth)acrylate oligomer, an epoxy (meth)acrylate oligomer, a polyester (meth)acrylate oligomer, a polyether (meth)acrylate oligomer, a polycarbonate (meth)acrylate oligomer, and an acrylic (meth)acrylate oligomer are preferred, a urethane (meth)acrylate oligomer and a polycarbonate (meth)acrylate oligomer are more preferred, and a urethane (meth)acrylate oligomer is even more preferred.

In order to enhance the processing characteristics, the scratch resistance, and the weatherability, the number of functional groups of each of the polymerizable oligomers is preferably not less than 2 and not more than 8, and the upper limit is preferably 6 or less, more preferably 4 or less, and even more preferably 3 or less.

In order to enhance the processing characteristics, the scratch resistance, and the weatherability, the weight-average molecular weight of each of the polymerizable oligomers is preferably not less than 2,500 and not more than 7,500, more preferably not less than 3,000 and not more than 7,000, and even more preferably not less than 3,500 and not more than 6,000. The weight-average molecular weight herein refers to an average molecular weight which is measured by GPC analysis and calculated in terms of standard polystyrene.

In the ionizing radiation-curable resin composition, for the purpose of reducing the viscosity of the ionizing radiation-curable resin, a monofunctional (meth)acrylate can be used in combination therewith. Each of the single monofunctional (meth)acrylates or a combination of two or more monofunctional (meth)acrylates may be used.

When the ionizing radiation-curable compound is an ultraviolet curable, the composition A preferably contains an additive(s) such as a photopolymerization initiator and a photopolymerization promoter.

Examples of the photopolymerization initiator include one or more selected from the group consisting of acetophenone, benzophenone, α-hydroxyalkylphenone, Michler's ketone, benzoin, benzil dimethylketal, benzoyl benzoate, α-acyl oxime ester, and thioxanthones.

The photopolymerization promoter mitigates the polymerization inhibition caused by the air during curing and promotes the cure rate, and examples include one or more selected from the group consisting of isoamyl p-(dimethylamino)benzoate and p-dimethylamino benzoic acid ethyl ester.

<<Radical Scavenger>>

The present invention comprises, as the radical scavenger, a radical scavenger i which includes an ethylenic double bond polymerizable with the ionizing radiation-curable resin composition and a radical scavenger ii which does not include an ethylenic double bond polymerizable with the ionizing radiation-curable resin composition.

Examples of the radical scavenger include aromatic radical scavengers, amin radical scavengers, organic acid radical scavengers, catechin radical scavengers, and hindered amine radical scavengers. Among these, a hindered amine radical scavenger is preferred. The hindered amine radical scavengers have the structure including the 2,2,6,6-tetramethylpiperidine skeleton in the molecule.

When only the radical scavenger i is used, the radical scavenger in the surface protective layer is all substantially fixed and there is no substantial radical scavenger that can move freely in the surface protective layer. As a result, the performance of scavenging the radicals becomes insufficient thus failing to achieve good weatherability of the decorative sheet. When only the radical scavenger i is used, the crosslinking density of the crosslinked product of the ionizing radiation-curable resin composition decreases since the radical scavenger i is polymerizable with the ionizing radiation-curable resin composition, leading to a decrease in the scratch resistance.

On the other hand, when only the radical scavenger ii is used, the radical scavenger ii bleeds out of the surface protective layer over time, a decent appearance of the decorative sheet surface is impaired and the concentration of the radical scavenger in the surface protective layer decreases over time causing insufficient weatherability.

In the present invention, the content of the radical scavenger in the composition A is not less than 0.5 parts by mass and less than 10.0 parts by mass, based on 100 parts by mass of the ionizing radiation-curable resin composition.

When a content of the radical scavenger is less than 0.5 parts by mass based on 100 parts by mass of the ionizing radiation-curable resin composition, the absolute amount of the radical scavenger is short. For this reason, even when the radical scavenger i and the radical scavenger ii are used in combination, the decorative sheet failed to achieve the good weatherability. When a content of the radical scavenger is more than 10.0 parts by mass based on 100 parts by mass of the ionizing radiation-curable resin composition, problems arise that decrease the crosslinking density of the crosslinked product of the ionizing radiation-curable resin composition in the surface protective layer, leading to a decrease in the scratch resistance and that easily cause the bleed out of the radical scavenger.

The content of the radical scavenger in the composition A is preferably not less than 0.8 parts by mass and not more than 5.0 parts by mass, and more preferably not less than 1.0 parts by mass and not more than 4.0 parts by mass, based on 100 parts by mass of the ionizing radiation-curable resin composition.

<<Radical Scavenger i>>

The radical scavenger i has an ethylenic double bond polymerizable with the ionizing radiation-curable resin composition. Example of the groups having an ethylenic double bond include a (meth)acryloyl group, a crotonyl group, a vinyl group, and an allyl group, and among these a (meth)acryloyl group is preferred. Thus, the radical scavenger i preferably has a (meth)acryloyl group.

There is no particular limitation on the number of the ethylenic double bonds in the radical scavenger i, and the number may be 1, or 2 or more. The radical scavenger i may be used singly, or two or more may be used.

Examples of the radical scavenger i having one ethylenic double bond include 4-(meth)acryloyloxy-2,2,6,6-tetramethyl piperidine, 4-(meth)acryloylamino-2,2,6,6-tetramethyl piperidine, 4-(meth)acryloyloxy-1,2,2,6,6-pentamethyl piperidine, 4-(meth)acryloylamino-1,2,2,6,6-pentamethyl piperidine, 4-cyano-4-(meth)acryloylamino-2,2,6,6-tetramethyl piperidine, 4-crotonyloxy-2,2,6,6-tetramethyl piperidine and 4-crotonylamino-2,2,6,6-tetramethyl piperidine, pentamethyl piperidinyl (meth)acrylate, the compound of CAS No. 1010692-24-6, and the compound of CAS No. 1010692-21-3.

Examples of the radical scavenger i having two or more ethylenic double bonds include 1-(meth)acryloyl-4-(meth)acryloylamino-2,2,6,6-tetramethyl piperidine, 1-(meth)acryloyl-4-cyano-4-(meth)acryloylamino-2,2,6,6-tetramethyl piperidine, 1-crotonyl-4-crotonyloxy-2,2,6,6-tetramethyl piperidine, the compound of CAS No. 1954659-42-7, and the compound of CAS No. 1010692-23-5.

<<Radical Scavenger ii>>

The radical scavenger ii does not have an ethylenic double bond polymerizable with the ionizing radiation-curable resin composition. The radical scavenger ii may be used singly, or two or more may be used.

Examples of the radical scavenger ii include 4-benzoyloxy-2,2,6,6-tetramethyl piperidine, bis(2,2,6,6-tetramethyl-4-piperidyl) sebacate, bis(1,2,2,6,6-pentamethyl-4-piperidyl) sebacate, bis(1-octyloxy-2,2,6,6-tetramethyl-4-piperidinyl) sebacate, bis(1,2,2,6,6-pentamethyl-4-piperidinyl) sebacate, methyl(1,2,2,6,6-pentamethyl-4-piperidinyl) sebacate, 2,4-bis[N-butyl-N-(1-cyclohexyloxy-2,2,6,6-tetramethyl-4-piperidinyl)amino]-6-(2-hydroxyethylamine)-1,3,5-tirazine), tetrakis(1,2,2,6,6-pentamethyl-4-piperidyl)-1,2,3,4-butanetetracarboxylate, and bis(1,2,2,6,6-pentamethyl-4-piperidyl)-2-(3,5-di-t-butyl-4-hydroxy-benzyl)-2-n-butyl malonate.

When the decorative sheet includes a primer layer in contact with the surface at the substrate side of the surface protective layer, the radical scavenger ii preferable has a functional group reactable with a functional group in a structural component of the primer layer. In such a structure, a part of the radical scavenger ii present near the interface between the surface protective layer and the primer layer is fixed at the interface and inhibits the bleed out, while the radical scavenger ii present at other places can move freely in the surface protective layer and maintain the radical scavenging performance, hence preferred. The reaction of the radical scavenger ii and the structural component of the primer layer at the interface between the surface protective layer and the primer layer can achieve good adhesion of the surface protective layer.

Examples of the functional group combinations satisfying the above conditions include the combinations shown in A to D of the following Table 1. Among these, A below (the radical scavenger ii has a hydroxyl group, and the structural component of the primer layer has an isocyanate group) is preferred.

TABLE 1

| | Functional group in structural component of primer layer | Functional group in radical scavenger ii |
| --- | --- | --- |
| A | Isocyanate group | Hydroxyl group |
| B | Isocyanate group | Amino group |
| C | Epoxy group | Hydroxyl group |
| D | Epoxy group | Amino group |

The hindered amine radical scavenger preferable as the radical scavenger i and the radical scavenger ii are classified into, for example, amino ether type and non-amino ether type.

In the hindered amine radical scavenger of the amino ether type, the hydrogen atom bonded to a nitrogen atom in the 2,2,6,6-tetramethyl piperidine skeleton is substituted with $OR^1$ or $OCOR^2$. $R^1$ and $R^2$ are an alkyl group and/or a cycloalkyl group, and preferably an alkyl group and/or a cycloalkyl group having not less than 5 and not more than 12 carbon atoms.

On the other hand, in the hindered amine radical scavenger of the non-amino ether type, the hydrogen atom bonded to a nitrogen atom in the 2,2,6,6-tetramethyl piperidine skeleton is an intact hydrogen atom, or substituted with an alkyl group.

The mixing ratio on a mass basis of the radical scavenger i and the radical scavenger ii is preferably 8:2 to 2:8, more preferably 7:3 to 3:7, and even more preferably 6:4 to 4:6.

When the radical scavenger ii is 2 or more based on 8 of the radical scavenger i, better weatherability can be achieved and the decrease in the crosslinking density of the crosslinked cured product of the ionizing radiation-curable resin composition can be easily inhibited. When the radical scavenger ii is 8 or less based on 2 of the radical scavenger i, the radical scavenger ii is inhibited from bleeding out.

<<Ultraviolet Absorber>>

The composition A forming the surface protective layer preferably contains a ultraviolet absorber.

Examples of the ultraviolet absorber include a benzotriazole ultraviolet absorber, a benzophenone ultraviolet absorber, and a triazine ultraviolet absorber, and a triazine ultraviolet absorber is preferred. Among triazine ultraviolet absorbers, a hydroxyphenyl triazine ultraviolet absorber in which three organic groups, selected from a hydroxyphenyl group, an alkoxyphenyl group, and an organic group containing one of these groups, are connected to the triazine ring is more preferred, and a hydroxyphenyl triazine ultraviolet absorber represented by the following general formula (1) is even more preferred. The hydroxyphenyl triazine ultraviolet absorber has a branched structure, and therefore it is expected to hardly bleed out of the surface protective layer. Thus, the excellent weatherability for a longer term is obtained.

The ultraviolet absorbers having an ethylenic double bond such as a (meth)acryloyl group, a vinyl group, and an allyl group easily inhibit the bleed out and are hence preferred.

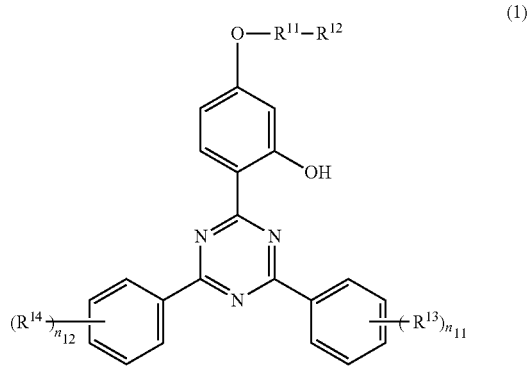

(1)

In the general formula (1), $R^{11}$ is a divalent organic group; $R^{12}$ is an ester group represented by $-C(=O)OR^{15}$; $R^{13}$, $R^{14}$ and $R^{15}$ are each independently a monovalent organic group; and $n_{11}$ and $n_{12}$ are each independently an integer of not less than 1 and not more than 5.

The divalent organic group $R^{11}$ can be exemplified by an aliphatic hydrocarbon group such as an alkylene group or an alkenylene group and, in order to enhance the weatherability, an alkylene group is preferred. The number of carbon atoms is preferably not less than 1 and not more than 20, more preferably not less than 1 and not more than 12, even more preferably not less than 1 and not more than 8, and especially preferably not less than 1 and not more than 4. The alkylene group and the alkenylene group may each be linear, branched, or cyclic, preferably linear or branched.

Examples of the alkylene group having 1 to 20 carbon atoms include a methylene group, a 1,1-ethylene group, a 1,2-ethylene group, various propylene groups such as 1,3-propylene, 1,2-propylene, and 2,2-propylene (as used herein, the term "various" includes linear and branched groups, and isomers thereof), various butylene groups, various pentylene groups, various hexylene groups, various heptylene groups, various octylene groups, various nonylene groups, various decylene groups, various undecylene groups, various dodecylene groups, various tridecylene groups, various tetradecylene groups, various pentadecylene groups, various hexadecylene groups, various heptadecylene groups, various octadecylene groups, various nonadecylene groups, and various eicosylene groups.

The monovalent organic groups $R^{13}$ and $R^{14}$ can be exemplified by an alkyl group, an alkenyl group, a cycloalkyl group, an aryl group, and an arylalkyl group. An aromatic hydrocarbon group such as an aryl group or an arylalkyl group is preferred, and an aryl group is more preferred. A phenyl group is especially preferred as the monovalent organic group $R^{13}$, $R^{14}$.

The number of carbon atoms of the aryl group is preferably not less than 6 and not more than 20, more preferably not less than 6 and not more than 12, and even more preferably not less than 6 and not more than 10. Examples include a phenyl group, various methylphenyl groups, various ethylphenyl groups, various dimethylphenyl groups, various propylphenyl groups, various trimethylphenyl groups, various butylphenyl groups, and various naphthyl groups. The number of carbon atoms of the arylalkyl group is preferably not less than 7 and not more than 20, more preferably not less than 7 and not more than 12, and even more preferably not less than 7 and not more than 10. Examples include a benzyl group, a phenethyl group, various phenylpropyl groups, various phenylbutyl groups, various methylbenzyl groups, various ethylbenzyl groups, various propylbenzyl groups, various butylbenzyl groups, and various hexylbenzyl groups.

The monovalent organic group $R^{15}$ can be exemplified by an alkyl group, an alkenyl group, a cycloalkyl group, an aryl group, and an arylalkyl group. An aliphatic hydrocarbon group such as an alkyl group or an alkenyl group is preferred, and an alkyl group is more preferred. Thus, $R^{12}$ is preferably an alkyl ester group or an alkenyl ester group, and more preferably an alkyl ester group.

The number of carbon atoms of the alkyl group is preferably not less than 1 and not more than 20, more preferably not less than 2 and not more than 16, and even more preferably not less than 6 and not more than 12. Examples of the alkyl group include a methyl group, an ethyl group, various propyl groups, various butyl groups, various pentyl groups, various hexyl groups, various octyl groups, various nonyl groups, various decyl groups, various undecyl groups, various dodecyl groups, various tridecyl groups, various tetradecyl groups, various pentadecyl groups, various hexadecyl groups, various heptadecyl groups, various octadecyl groups, various nonadecyl groups, and various eicosyl groups.

The number of carbon atoms of the alkenyl group is preferably not less than 2 and not more than 20, more preferably not less than 3 and not more than 16, and even more preferably not less than 6 and not more than 12.

Examples of the alkenyl group include a vinyl group, various propenyl groups, various butenyl groups, various pentenyl groups, various hexenyl groups, various octenyl groups, various nonenyl groups, various decenyl groups, various undecenyl groups, various dodecenyl groups, various tridecenyl group, various tetradecenyl groups, various pentadecenyl groups, various hexadecenyl groups, various heptadecenyl groups, various octadecenyl groups, various nonadecenyl groups, and various eicosenyl groups.

Among hydroxyphenyl triazine compounds as represented by the general formula (1), a hydroxyphenyl triazine compound, in which $R^{11}$ is an alkylene group having 1 to 20 carbon atoms, $R^{12}$ is an alkyl ester group in which the alkyl group $R^{15}$ has 1 to 20 carbon atoms, $R^{13}$ and $R^{14}$ are each an aryl group having 6 to 20 carbon atoms, and $n_{11}$ and $n_{12}$ are each 1, is preferred; a hydroxyphenyl triazine compound, in which Rn is an alkylene group having 1 to 12 carbon atoms, $R^{12}$ is an alkyl ester group in which the alkyl group $R^{15}$ has 2 to 16 carbon atoms, $R^{13}$ and $R^{14}$ are each an aryl group having 6 to 12 carbon atoms, and $n_{11}$ and $n_{12}$ are each 1, is more preferred; a hydroxyphenyl triazine compound, in which Rn is an alkylene group having 1 to 8 carbon atoms, $R^{12}$ is an alkyl ester group in which the alkyl group $R^{15}$ has 6 to 12 carbon atoms, $R^{13}$ and $R^{14}$ are each an aryl group having 6 to 10 carbon atoms, and $n_{11}$ and $n_{12}$ are each 1, is even more preferred; and a hydroxyphenyl triazine compound, in which $R^{11}$ is an alkylene group having 1 to 4 carbon atoms, $R^{12}$ is an alkyl ester group in which the alkyl group $R^{15}$ has 8 carbon atoms, $R^{13}$ and $R^{14}$ are each a phenyl group, and $n_{11}$ and $n_{12}$ are each 1, is especially preferred.

In particular, among hydroxyphenyl triazine compounds as represented by the general formula (1), a hydroxyphenyl triazine compound, in which $R^{11}$ is an ethylene group, $R^{12}$ is an ester group in which $R^{15}$ is an isooctyl group, $R^{13}$ and $R^{14}$ are each a phenyl group, and $n_{11}$ and $n_{12}$ are each 1, namely 2-(2-hydroxy-4-[1-octyloxycarbonylethoxy]phenyl)-4,6-bis(4-phenylphenyl)-1,3,5-triazine, represented by the following chemical formula (2), is preferred. The hydroxyphenyl triazine compound is, for example, available as a commercial product ("TINUVIN 479", manufactured by BASF SE).

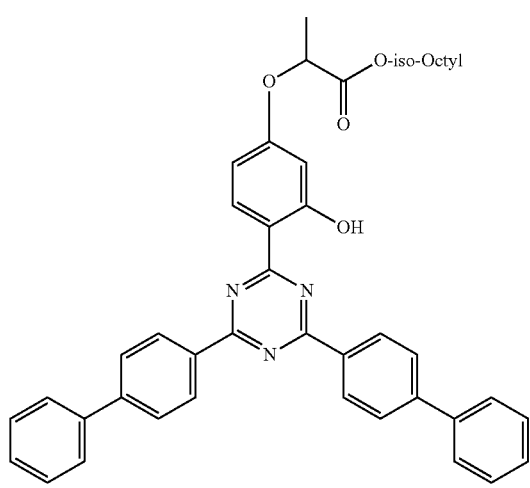

(2)

The content of ultraviolet absorber in the composition A is preferably not less than 0.2 parts by mass and not more than 10.0 parts by mass, more preferably not less than 0.5 parts by mass and not more than 5.0 parts by mass, and even more preferably not less than 1.0 parts by mass and not more than 4.0 parts by mass, based on 100 parts by mass of the ionizing radiation-curable resin composition. The ultraviolet absorber may be used in a single type, or in combination of two or more types.

<<Antioxidant>>

The composition A forming the surface protective layer preferably contains an antioxidant. When an antioxidant is contained, better weatherability is easily achieved.

Examples of the antioxidant include a phenol antioxidant, an amine antioxidant, a sulfur antioxidant, and a phosphorus antioxidant. Among these, a phenol antioxidant is preferred.

Examples of the phenol antioxidant include a hindered phenol antioxidant. Specific examples include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylene bis[3-(3,5-di-tert-butyl-4-hydroxyphenyl)propionate], N,N'-hexane-1,6-diylbis[3-(3,5-di-tert-butyl-4-hydroxyphenylpropionamide), 2,4-dimethyl-6-(1-methylpentadecyl)phenol, diethyl[[3,5-bis(1,1-dimethylethyl)-4-hydroxyphenyl]methyl]phosphate, 3,3',3",5,5',5"-hexa-tert-butyl-a,a',a"-(mesitylene-2,4,6-triyl)tri-p-cresol, 4,6-bis(octylthiomethyl)-o-cresol, ethylenebis(oxyethylene) bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamino)phenol, and 2-[1-(2-hydroxy-3,5-di-tert-pentylphenyl)ethyl]-4,6-di-tert-pentylphenyl acrylate.

The thickness of the surface protective layer is preferably not less than 1.5 µm and not more than 20 µm, more preferably not less than 2 µm and not more than 15 µm, and even more preferably not less than 3 µm and not more than 10 µm, in view of the balance among the processing characteristics, the scratch resistance, and the weatherability.

<Primer Layer>

The decorative sheet preferably includes a primer layer in contact with the surface at the substrate side of the surface protective layer. The primer layer enhances the adhesion between the substrate and the surface protective layer, assures the long-term interlayer adhesion when the decorative sheet is exposed outdoor (so-called weather-proof adhesive) and easily achieves good scratch resistance.

The primer layer is mainly constituted from a binder resin and may optionally contain an additive(s) such as an ultraviolet absorber and a light stabilizer.

Examples of the binder resin include resins such as a urethan resin, an acrylic polyol resin, an acrylic resin, an ester resin, an amide resin, a butyral resin, a styrene resin, a urethane-acrylate copolymer, a polycarbonate urethan-acrylate copolymer (a urethane-acrylate copolymer derived from a polymer (polycarbonate polyol) in which the polymer backbone includes carbonate bonds and has 2 or more hydroxyl groups at the terminus and side chains), a vinyl chloride-vinyl acetate copolymer resin, a vinyl chloride-vinyl acetate-acrylate copolymer resin, a chlorinated propylene resin, a nitrocellulose resin (flash cotton), and a cellulose acetate resin. These resins can be used singly or in a combination of two or more. The binder resin may be a crosslinked cured product of these resins to which a curing agent such as an isocyanate curing agent or an epoxy curing agent is added. Among these, a crosslinked and cured polyol resin such as an acrylic polyol resin with an isocyanate curing agent is preferred, and a crosslinked and cured acrylic polyol resin with an isocyanate curing agent is more preferred.

As described above, the binder resin preferably has a functional group reactable with a functional group in the radical scavenger ii.

The thickness of the primer layer is preferably not less than 1 μm and not more than 10 μm, more preferably not less than 2 μm and not more than 8 μm, and even more preferably not less than 3 μm and not more than 6 μm.

The decorative sheet may include a back-side primer layer at the opposite side of the surface protective layer of the substrate for the purpose of enhancing the adhesion to the adherend or the like.

<Transparent Resin Layer>

The decorative sheet, in order to increase the strength, may include a transparent resin layer between the substrate and the surface protective layer. When the decorative sheet includes the primer layer, the transparent resin layer is preferably located between the substrate and the primer layer. When the decorative sheet includes a decorative layer, the transparent resin layer is preferably located between the decorative layer and the surface protective layer to protect the decorative layer.

Examples of resins constituting the transparent resin layer include a polyolefin resin, a polyester resin, a polycarbonate resin, an acrylonitrile-butadiene-styrene resin (hereinafter also referred to as an "ABS resin"), an acrylic resin, and a vinyl chloride resin. Among them, in view of enhancing the processing characteristics, a polyolefin resin is preferred, and in view of easily adjusting the water vapor transmission rate, a polyolefin resin and a vinyl chloride resin are preferred, and a polyolefin resin is more preferred. Two or more of these exemplified resins can be used in lamination or in a mixture.

The content of a polyolefin resin in the transparent resin layer is preferably 50% by mass or more, more preferably 70% by mass or more, and even more preferably 90% by mass or more, based on all resin components of the transparent resin layer to enhance the processing suitability.

Examples of the polyolefin resin of the transparent resin layer include polyethylenes (low-density, middle-density, high-density), polypropylene, polymethylpentene, polybutene, an ethylene-propylene copolymer, a propylene-butene copolymer, an ethylene-vinyl acetate copolymer, an ethylene-acrylate copolymer, and an ethylene-propylene-butene copolymer. Among these, polyethylenes (low-density, middle-density, high-density), polypropylene, an ethylene-propylene copolymer, a propylene-butene copolymer are preferred, and polypropylene is more preferred. The polyolefin resin can also preferably use from the polyethylene resins and the polypropylene resins described as specific examples of the above resins constituting the plastic of the substrate.

When a vinyl chloride resin is used as the transparent resin layer, the vinyl chloride resins described as specific examples of the above resins constituting the plastic of the substrate can be preferably used.

The transparent resin layer may contain an additive(s) such as an ultraviolet absorber, a light stabilizer, and a colorant.

The thickness of the transparent resin layer is preferably not less than 20 μm and not more than 150 μm, more preferably not less than 40 μm and not more than 120 μm, and even more preferably not less than 60 μm and not more than 100 μm, in view of easily adjusting the water vapor transmission rate, and further the balance among the scratch resistance, the processing suitability, and the weatherability.

<Decorative Layer>

The decorative sheet preferably includes a decorative layer at any place of the decorative sheet in order to enhance the design. It is preferred to form the decorative layer at the side closer to the substrate in order to enhance the weatherability of the decorative layer. For example, when the decorative sheet has the primer layer, the decorative layer is preferably located between the substrate and the primer layer. When the decorative sheet has the transparent resin layer, the decorative layer is preferably located between the substrate and the transparent resin layer.

The decorative layer may be, for example, a colored layer formed by coating the entire surface (so-called solid colored layer), or a picture layer formed by printing a pattern by using an ink(s) and a printer. The picture (pattern) of the picture layer may be a grain pattern such as a grain ring and a duct of the wooden board surface, a stone pattern at the slate surface such as marble and granite, a texture pattern at the fabric surface, a leather grain pattern at the leather surface, a geometric pattern, a letter, a shape, or may be a combination thereof.

An appropriate mixture of a binder resin with an additive(s), such as a colorant, e.g. a pigment or a dye, an extender pigment, a solvent, a stabilizer, a plasticizer, a catalyst, a curing agent, an ultraviolet absorber, a light stabilizer, etc., can be used as an ink for the decorative layer.

There is no particular limitation on the binder resin of the decorative layer. Examples include resins such as a urethane resin, an acrylic polyol resin, an acrylic resin, an ester resin, an amide resin, a butyral resin, a styrene resin, a urethane-acrylate copolymer, a vinyl chloride-vinyl acetate copolymer resin, a vinyl chloride-vinyl acetate-acrylate copolymer resin, a chlorinated propylene resin, a nitrocellulose resin, and a cellulose acetate resin. Various types of resins such as a one-component curable resin, and a two-component curable resin using a curing agent such as an isocyanate compound, can also be used.

Preferable colorants are pigments having excellent masking properties and weatherability. The pigments usable are the same as exemplified for the plastic substrate.

The content of the colorant is preferably not less than 5 parts by mass and not more than 90 parts by mass, more preferably not less than 15 parts by mass and not more than 80 parts by mass, and even more preferably not less than 30 parts by mass and not more than 70 parts by mass, based on 100 parts by mass of the resin constituting the decorative layer.

The decorative layer may contain an additive(s) such as an ultraviolet absorber, a light stabilizer, and a colorant.

While the thickness of the decorative layer is appropriately selected depending on the intended picture, it is preferably not less than 0.5 μm and not more than 20 μm, more preferably not less than 1 μm and not more than 10 μm, and even more preferably not less than 2 μm and not more than 5 μm in order to mask the color of an adherend and enhance the design.

<Adhesive Layer A>

When the decorative sheet includes the transparent resin layer, it is preferred to form the adhesive layer A between the substrate and the transparent resin layer in order to enhance the adhesion of both layers.

When the decorative layer is further included between the substrate and the transparent resin layer, there is no particular limitation on the positional relation between the adhesive layer A and the decorative layer. More specifically, the decorative sheet of the present invention may have the decorative layer, the adhesive layer A and the transparent resin layer in this order from the side closer to the substrate, or may have the adhesive layer A, the decorative layer, and the transparent resin layer in this order from the side closer to the substrate.

The adhesive layer A can be composed of adhesives such as a urethane adhesive, an acrylic adhesive, an epoxy adhesive, and a rubber adhesive. Among these adhesives, a urethane adhesive is preferred for its adhesive strength.

Examples of the urethane adhesive include an adhesive utilizing a two-component curable urethane resin containing various polyol compounds such as polyether polyols, polyester polyols, and acrylic polyols and a curing agent such as an isocyanate compound.

The thickness of the adhesive layer A is preferably not less than 0.1 μm and not more than 30 μm, more preferably not less than 1 μm and not more than 15 μm, and even more preferably not less than 2 μm and not more than 10 μm.

The above-described decorative layer, adhesive layer A, primer layer, and top coat layer can be formed by applying a coating solution containing a composition for forming each layer by a known method such as a gravure printing method, a bar coating method, a roll coating method, a reverse roll coating method, or a comma coating method, and optionally drying and curing.

The decorative sheet may be imparted (also referred to as forming) with an intended roughening shape (also referred to as roughening pattern) by embossing.

When the embossing is performed, the decorative sheet is heated to, for example, preferably not less than 80° C. and not more than 260° C., more preferably not less than 85° C. and not more than 160° C., and even more preferably not less than 100° C. and not more than 140° C., and an embossed plate is pressed against the decorative sheet to perform the embossing. It is preferred to press the embossed plate at the surface-protective-layer side of the decorative sheet.

[Decorative Material]

The decorative material of the present invention includes an adherend and the above-described decorative sheet of the present invention. More specifically, the decorative material is a laminate of the adherend and the decorative sheet, with the surface of the adherend that requires decoration facing the substrate layer-side surface of the decorative sheet.

<Adherend>

The adherend can be exemplified by plates made of a variety of materials such as flat plates or curved plates, an article having a three-dimensional shape such as a cylinder or a polygonal prism, and a sheet (or a film). Specific examples thereof may include a wood member such as a single wood plate, a plywood plate, a composite wood, a particle board, an MDF (medium-density fiberboard), made of a variety of woods such as Japanese cedar, Japanese cypress, pine, and lauan; a metal member made of a metal such as iron, aluminum, copper, and an alloy containing one or more of these metals; a ceramic member made of glass, a ceramic such as pottery, gypsum, cement, ALC (autoclaved lightweight concrete), and a non-ceramic material such as a calcium silicate; and a resin member made of an acrylic resin, a polyester resin, a polystyrene resin, a polyolefin resin such as polypropylene, an ABS (acrylonitrile-butadiene-styrene copolymer) resin, a phenol resin, a vinyl chloride resin, a cellulose resin, or a rubber. These members can be used singly or in a combination of two or more.

The adherend may be appropriately selected from the above members depending on the intended use. When the decorative material is used for an interior member of an architectural structure such as a wall, a ceiling, and a floor; for an exterior member of an architectural structure such as an outer wall, a roof, an eaves soffit, a railing, and a gate; for fittings or a fixture member such as a window frame, a door, a handrail, a skirting board, a crown molding, and a cable cover; or for the like, the adherend is preferably including at least one member selected from a wood member, a metal member, and a resin member. When the decorative material is used for an exterior member such as a front door; for fittings such as a window frame or a door; or for the like, the adherend is preferably including at least one member selected from a metal member and a resin member.

While the thickness of the adherend may be appropriately selected depending on the intended use and the material, it is preferably not less than 0.1 mm and not more than 100 mm, more preferably not less than 0.3 mm and not more than 5 mm, and even more preferably not less than 0.5 mm and not more than 3 mm.

<Adhesive Layer B>

In order to obtain excellent adhesion between the adherend and the decorative sheet, they are preferably attached to each other via an adhesive layer B.

There is no particular limitation on the adhesive used for the adhesive layer B, and a known adhesive can be used and appropriately selected depending on the intended use. Examples of the adhesive used for the adhesive layer B preferably include adhesives such as a moisture curing adhesive, an anaerobic curing adhesive, a dry curing adhesive, a UV curing adhesive, a heat-sensitive adhesive (e.g. hot-melt adhesive), and a pressure-sensitive adhesive. A moisture curing adhesive and a heat-sensitive adhesive are preferred in view of the compatibility with the decorative material of the present embodiment having the predetermined moisture vapor transmission rate and the handleability. A moisture curing and heat-sensitive adhesive are more preferred.

A heat-sensitive adhesive is preferred because an adhesive strength rises to a saturation at the same time as a melted liquid adhesive layer B is cooled and solidified.

The decorative material of the present embodiment has a water vapor transmission rate of not less than 0.75 g/m$^2$·24 h. For this reason, a moisture curing adhesive can contact an appropriate moisture in the application process, easily increasing an initial tight contact strength of the adhesive used for the adhesive layer B. The decorative material of the present embodiment has a water vapor transmission rate of not more than 45 g/m$^2$·24 h. For this reason, a moisture curing adhesive does not contact an excess moisture and the decrease in adhesion caused by the degradation associated with the hydrolysis of the moisture curing adhesion can be therefore prevented. As a result, excellent long-term adhesion and the application suitability are easily obtained. A moisture curing adhesive is also preferred for its handleability.

Examples of resins which are usable for these adhesives include an acrylic resin, a urethane resin, a vinyl chloride resin, a vinyl acetate resin, a vinyl chloride-vinyl acetate copolymer, a styrene-acrylate copolymer, a polyester resin, an amide resin, a cyanoacrylate resin, and an epoxy resin. These resins can be used singly or in a combination of two or more. A two-component curable urethane or ester adhesive, using a curing agent such as an isocyanate compound, can also be used.

A gluing agent may also be used for the adhesive layer. An acrylic, urethane, silicone or rubber gluing agent can be appropriately selected and used.

A moisture curing adhesive having the resin base of a urethane resin, which is one of the adhesives preferably used in the present embodiment, has a prepolymer having an isocyanate group at a molecular end as the essential component. Such a prepolymer is generally a polyisocyanate prepolymer that has 1 or more isocyanate groups at both molecular ends and is a solid thermoplastic resin at room temperature. Examples of such a polyisocyanate prepolymer include a polyisocyanate prepolymer using a crystalline solid polyester polyol at room temperature as the polyol component and polyisocyanate including 4,4-diphenylmethane diisocyanate or tolylene diisocyanate as the polyisocyanate component.

While there is no particular limitation on the thickness of the adhesive layer B, it is preferably not less than 1 μm and not more than 100 μm, more preferably not less than 5 μm and not more than 50 μm, and even more preferably not less than 10 μm and not more than 30 μm in order to obtain excellent adhesiveness.

<Decorative Material Production Method>

The decorative material can be produced through a process of laminating the decorative sheet and an adherend together.

The process involves laminating an adherend and the decorative sheet of the present invention, with the surface of the adherend that requires decoration facing the substrate-side surface of the decorative sheet.

Examples of the method for laminating the adherend and the decorative sheet include a lamination method which involves pressing the decorative sheet against a plate-like adherend via the adhesive layer B to laminate by pressing using a pressure roller.

When a hot-melt adhesive (heat-sensitive adhesive) is used as the adhesive, the heating temperature is preferably not less than 160° C. and not more than 200° C., though it may vary depending on the type of the resin constituting the adhesive. In the case of using a reactive hot-melt adhesive, the heating temperature is preferably not less than 100° C. and not more than 130° C. When the lamination process is performed by the vacuum forming method, the process is generally carried out while heating the decorative sheet and the adherend preferably at a temperature of not less than 80° C. and not more than 130° C., more preferably at a temperature of not less than 90° C. and not more than 120° C.

In the embodiment illustrated in FIG. 1, the decorative sheet 100 had the laminate structure of the following (1), however, various forms of laminate structures can be selected depending on the intended use and required performance as long as the decorative sheet has at least the surface protective layer defined by the present invention described above on the substrate. Examples of other specific laminate structures of the decorative sheet of the present invention include the following laminate structures of (2) to (7).

(1) Substrate 50/decorative layer 40/transparent resin layer 30/primer layer 20/surface protective layer 10
(2) Substrate 50/surface protective layer 10
(3) Substrate 50/primer layer 20/surface protective layer 10
(4) Substrate 50/transparent resin layer 30/surface protective layer 10
(5) Substrate 50/decorative layer 40/surface protective layer 10
(6) Substrate 50/transparent resin layer 30/decorative layer 40/surface protective layer 10
(7) Substrate 50/transparent resin layer 30/decorative layer 40/primer layer 20/surface protective layer 10

In the above (1) to (7), a known adhesive layer (the above adhesive layer A) may be interjacent between the substrate and the transparent resin layer and/or the decorative layer, or roughening shapes such as wood grain duct, sand texture, satin texture, hair line, and leather grain may be formed on the surface of the substrate, the transparent resin layer, etc., using the embossing or other known various techniques.

In the present paragraph, the "/" means the interface of each layer.

The thus-obtained decorative material may be arbitrarily cut, and the front or end surface(s) may be subjected to decoration processing, such as grooving or chamfering, by using a cutting machine such as a router or a cutter. The decorative material can be used for various uses including an interior member of an architectural structure such as a wall, a ceiling, and a floor; for an exterior member such as an outer wall, an eaves soffit, a roof, a railing, and a fence; or for fittings or a fixture member such as a window frame, a door, a door frame, a handrail, a skirting board, a crown molding, and a cable cover; a surface decorative plate for furniture such as a chest of drawers, a shelf, and a desk; kitchen furniture such as a dining table and a sink; home appliance and a cabinet of an OA instrument, etc.; and an interior member and an exterior member of a vehicle.

EXAMPLES

The following examples illustrate the present invention in greater detail and are not intended to limit the scope of the invention.

1. Evaluations and Measurements 1-1. Weatherability

The decorative sheets obtained in Examples and Comparative Examples were subjected for an accelerated weather resistance test by a metal halide lamp (MWOM) for 1000 hours, and then the appearance was visually observed from the surface protective layer side. Twenty subjects evaluated the sheet as 3 points when no change in appearance was confirmed, the sheet as 2 points when a mild decrease in glossiness was confirmed, and the sheet as 1 point when a notable decrease in glossiness was confirmed or a crack was observed. The average point of the evaluations by the twenty subjects was calculated and ranked by the following criteria. The results are shown in Table 2. Test equipment and test conditions were as follows.

<Evaluation Criteria of Weatherability>
AA: Average point of 2.7 or more
A: Average point of 2.5 or more and less than 2.7
B: Average point of 2.0 or more and less than 2.5
C: Average point of 1.5 or more and less than 2.0
D: Average point of less than 1.5

<Test Equipment>
Name of the product "DAIPLA METAL WEATHER", manufactured by DAIPLA WINTES Co., Ltd.

<Irradiation Conditions>
Irradiance: 65 mW/m$^2$, black panel temperature: 63° C., humidity in chamber: 50% RH, time: 20 hours <Condensation Conditions>
Irradiance: 0 mW/m$^2$, humidity in chamber: 98% RH, time: 4 hours 1-2. Scratch Resistance The surface of the decorative sheets obtained in Examples and Comparative Examples was subjected to a rubbing test by reciprocating a steel wool ("Bon Star #0000", manufactured by NIHON STEEL WOOL Co., Ltd.) 5 times with a load of 300 g/m². After the rubbing test, the surface condition of the decorative sheet was visually observed. Twenty subjects evaluated the surface as 3 points when no scratch or change in appearance was confirmed, the surface as 2 points when a mild scratch and a mild change in glossiness were confirmed, and the surface as 1 point when scratches and a notable change in glossiness were confirmed. The average point of the evaluations by the twenty subjects was calculated and ranked by the following criteria. The results are shown in Table 2.

<Evaluation Criteria of Scratch Resistance>
  A: Average point of 2.5 or more
  B: Average point of 2.0 or more and less than 2.5
  C: Average point of 1.5 or more and less than 2.0
  D: Average point of less than 1.5

1-3. Bleed Out

The decorative sheets obtained in Examples and Comparative Examples were immersed in hot water at 40° C. for 1 week. After immersion, the decorative sheet was taken out from the hot water, dried, and then visually observed for the appearance of the immersed decorative sheet from the surface protective layer side. Twenty subjects evaluated the surface as 3 points when no change in appearance was confirmed, the surface as 2 points when a mild bleeding was confirmed with no practical problem, and the surface as 1 point when a notable bleeding was confirmed. The average point of the evaluations by the twenty subjects was calculated and ranked by the following criteria. The results are shown in Table 2.

<Evaluation Criteria of Bleed Out>
  AA: Average point of 2.7 or more
  A: Average point of 2.5 or more and less than 2.7
  B: Average point of 2.0 or more and less than 2.5
  C: Average point of 1.5 or more and less than 2.0
  D: Average point of less than 1.5

1-4. Measurement of Water Vapor Transmission Rate

The water vapor transmission rate was measured on the decorative sheets obtained in Examples and Comparative Examples in accordance with Testing Methods for Determination of the Water Vapor Transmission Rate of Moisture-Proof Packaging Materials (Dish Method) defined in JIS Z0208:1976.

1-5. Evaluation of Application Suitability

The decorative sheets obtained in Examples and Comparative Examples and an adherend (material: polyvinyl chloride (PVC)) on a flat plate having a width of 25 mm were attached via an adhesive layer having a thickness of 50 μm obtained by melting at 120° C. a moisture curing and hot-melt urethan resin adhesive (a polyurethane prepolymer having an isocyanate group in the molecule, "1308.20 (product name)", manufactured by TAKA). Subsequently, the adhesive layer was cooled and solidified at room temperature of 23° C. Then, the laminate of the decorative sheet and the adherent was allowed to stand for 1 hour under environment of 90° C. to prepare a sample. The sample was subjected to a peeling test under temperature environment of 25° C. using a TENSILON Universal Material Testing Instrument ("TENSILON RTC-1250A (product name)", manufactured by ORIENTEC CORPORATION) under the conditions of a tensile speed: 10 mm/min, a peeling direction: 90°, and a distance between chucks: 30 mm, and a peel strength was measured as the initial adhesive strength. The measurement results were evaluated by the following criteria. The evaluation of B or higher is a Pass for the application suitability.

<Evaluation Criteria of Application Suitability>
  A: peel strength was 1.0 N/mm or more.
  B: peel strength was 0.5 N/mm or more and less than 1.0 N/mm.
  C: peel strength was less than 0.5 N/mm.

1-6. Evaluation of Long-Term Adhesion

The sample prepared in the above "1-5. Evaluation of Application Suitability" was allowed to stand for 6 weeks under heat and humidity environment of 70° C. and 90% RH, then subjected to a peeling test under temperature environment of 25° C. using a TENSILON Universal Material Testing Instrument ("TENSILON RTC-1250A (product name)", manufactured by ORIENTEC CORPORATION) under the conditions of a tensile speed: 50 mm/min and a peeling direction: 90°, and a peel strength was measured. The measurement results were evaluated by the following criteria. The evaluation of B or higher is a Pass for the long-term adhesion.

<Evaluation Criteria of Long-term Adhesion>
  A: peel strength of 2.0 N/mm or more.
  B: peel strength of 1.0 N/mm or more and less than 2.0 N/mm.
  C: peel strength of less than 1.0 N/mm.

1-7. Processing Suitability

When the sample was prepared in the above "1-5. Evaluation of Application Suitability", occurrence of a non-adhesion portion of the decorative material was visually observed at a bending part (bending angle: 1 mmR) during the attachment (lamination) and evaluated by the following criteria. The evaluation of B or higher is a Pass for the processing suitability.

<Evaluation Criteria of Processing Suitability>
  A: No non-adhesion portion was observed at all.
  B: Almost no non-adhesion portion was observed.
  C: Non-adhesion portion was observed and delaminated.

2. Preparation of a Decorative Sheet

Example 1

On one surface of the substrate (a titanium oxide-containing propylene resin sheet having a thickness of 80 μm (also referred to as "polypropylene resin sheet PO-1")) on both surfaces of which a corona discharge treatment was applied, an ink for a decorative layer containing a two-component curable acrylic-urethane resin and a colorant was applied by gravure printing and dried, thereby forming a grain pattern-decorative layer having a thickness of 3 μm.

Subsequently, an ink for a back-side primer layer containing a two-component curable urethane-flash cotton mixed resin was applied onto the other surface of the substrate and dried, thereby forming a back-side primer layer having a thickness of 3 μm.

Subsequently, an adhesive layer having a thickness of 3 μm composed of a urethane resin adhesive was formed on the decorative layer, and a polypropylene resin was meltextruded by a T-die extruder onto the adhesive layer to form a transparent resin layer having a thickness of 80 μm.

After performing a corona discharge treatment on the surface of the transparent resin layer, an ink for a primer layer having the composition below was applied by gravure printing and dried, thereby forming a primer layer having a thickness of 4 μm on the transparent resin layer.

Subsequently, an ink (the composition A) for a surface protective layer having the composition below was applied on the primer layer by the roll coating method to form an uncured surface protective layer, and thereafter, the layer was irradiated with an electron beam (pressurized voltage: 175 KeV and 5 Mrad (50 kGy)) to crosslink and cure the composition A, thereby forming a surface protective layer having a thickness of 5 μm.

Then, embossing was performed on the surface protective layer to form a roughening pattern of wood grain duct having the maximum depth of 50 μm at the recessed part, thereby obtaining the decorative sheet of Example 1. The evaluations and measurements based on the above methods were performed on the obtained decorative sheet. The evaluation and measurement results are shown in Table 2.

<Ink for Primer Layer>

| | |
|---|---|
| A mixture of polycarbonate urethane-acrylate copolymer and acrylic polyol | 100 Parts by mass |
| Hexamethylene diisocyanate | 5 Parts by mass |
| An ultraviolet absorber (hydroxyphenyl triazine, manufactured by BASF, product name "TUNUVIN479") | 3 Parts by mass |
| An ultraviolet absorber, (hydroxyphenyl triazine, manufactured by BASF, product name "TUNUVIN400") | 12 Parts by mass |

<Ink for Surface Protective Layer (Composition A)>

| | |
|---|---|
| An ionizing radiation-curable resin composition (a trifunctional urethane acrylate oligomer having a weight average molecular weight of 4000) | 100 Parts by mass |
| Radical scavenger i (pentamethyl piperidinyl methacrylate) (non-amino ether type, number of ethylenic double bond: 1) including an ethylenic double bond polymerizable with the ionizing radiation-curable resin composition | 1 Part by mass |
| Radical scavenger ii-a (bis(1-octyloxy-2,2,6,6-tetramethyl-4-piperidinyl) sebacate) (amino ether type, no functional group reactable with a functional group in the structural component of the primer layer) that does not include an ethylenic double bond polymerizable with the ionizing radiation-curable resin composition | 1 Part by mass |
| An ultraviolet absorber (hydroxyphenyl triazine, TUNUVIN479, manufactured by BASF) | 2 Parts by mass |
| A hindered phenol antioxidant | 1 Part by mass |

Examples 2 to 7, Comparative Examples 1 to 5

The decorative sheets of Examples 2 to 7 and Comparative Examples 1 to 5 were obtained in the same manner as in Example 1 except that the mixing amounts of the radical scavenger i and the radical scavenger ii-a to the ionizing radiation-curable resin composition in the composition A were changed as shown in Table 1. The evaluations and measurements based on the above methods were performed on the obtained decorative sheets. The evaluation and measurement results are shown in Table 2.

Example 8

The decorative sheet of Example 8 was obtained in the same manner as in Example 1 except that the radical scavenger ii-a in the composition A was changed to the following radical scavenger ii-b. The evaluations and measurements based on the above methods were performed on the obtained decorative sheet. The evaluation and measurement results are shown in Table 2.

Radical Scavenger ii-b of Example 8

2,4-Bis[N-butyl-N-(1-cyclohexyloxy-2,2,6,6-tetramethylpiperidin-4-yl) amino]-6-(2-hydroxyethylamine)-1,3,5-triazine (amino ether type, with a functional group (hydroxyl group) reactable with a functional group (isocyanate group) in the structural component of the primer layer).

Examples 9 to 11, Comparative Examples 6 to 7

The decorative sheets of Examples 9 to 11, Comparative Examples 6 to 7 were prepared in the same manner as in Example 1 except that the substrate and the transparent resin layer in Example 1 were changed as shown in Table 3. The evaluations and measurements based on the above methods were performed on the obtained decorative sheets. The evaluation and measurement results are shown in Table 3.

TABLE 2

| | | Example | | | | | | | | Comparative Example | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Composition A Mixing ratio *mass basis | Ionizing radiation-curable resin composition | 100 | 100 | 100 | 100 | 100 | 100 | 100 | 100 | 100 | 100 | 100 | 100 | 100 |
| | Radical scavenger i | 1.0 | 3.0 | 0.4 | 0.4 | 1.6 | 1.8 | 0.8 | 1.0 | 0 | 2.0 | 5.0 | 0.2 | 6.0 |
| | Radical scavenger ii-a | 1.0 | 3.0 | 0.4 | 1.6 | 0.4 | 1.2 | 1.2 | 0 | 2.0 | 0.0 | 5.0 | 0.2 | 0 |
| | Radical scavenger ii-b | 0 | 0 | 0 | 0 | 0 | 0 | 0 | 1.0 | 0 | 0 | 0 | 0 | 0 |
| Substrate | | PO-1 | PO-1 | PO-1 | PO-1 | PO-1 | PO-1 | PO-1 | PO-1 | PO-1 | PO-1 | PO-1 | PO-1 | PO-1 |
| Transparent resin layer | | PO-A | PO-A | PO-A | PO-A | PO-A | PO-A | PO-A | PO-A | PO-A | PO-A | PO-A | PO-A | PO-A |
| Water vapor transmission rate (g/m² · 24 h) | | 1.5 | 1.5 | 1.5 | 1.5 | 1.5 | 1.5 | 1.5 | 1.5 | 1.5 | 1.5 | 1.5 | 1.5 | 1.5 |
| Weatherability | | A | A | B | B | B | A | A | AA | C | C | B | C | C |
| Scratch resistance | | A | B | A | A | A | A | A | A | A | A | D | A | C |
| Bleed out | | A | B | AA | B | A | A | A | AA | B | AA | D | A | A |

TABLE 2-continued

|  | Example | | | | | | | | Comparative Example | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Application suitability | B | B | B | B | B | B | B | B | B | B | B | B | B |
| Long-term adhesion | A | A | A | A | A | A | A | A | A | A | A | A | A |
| Processing suitability | A | A | A | A | A | A | A | A | A | A | A | A | A |

TABLE 3

|  |  | Example | | | Comparative Example | |
| --- | --- | --- | --- | --- | --- | --- |
|  |  | 9 | 10 | 11 | 6 | 7 |
| Composition A Mixing ratio *mass basis | Ionizing radiation-curable resin composition | 100 | 100 | 100 | 100 | 100 |
|  | Radical scavenger i | 1.0 | 1.0 | 1.0 | 1.0 | 1.0 |
|  | Radical scavenger ii-a | 1.0 | 1.0 | 1.0 | 1.0 | 1.0 |
|  | Radical scavenger ii-b | 0 | 0 | 0 | 0 | 0 |
| Substrate |  | PO-2 | PO-3 | PVC1 | PVC2 | PO-4 |
| Transparent resin layer |  | PO-A | PO-B | — | — | PO-C |
| Water vapor transmission rate ($g/m^2 \cdot 24$ h) |  | 5 | 10 | 35 | 50 | 0.5 |
| Weatherability |  | A | A | A | A | A |
| Scratch resistance |  | A | A | A | A | A |
| Bleed out |  | A | A | A | A | A |
| Application suitability |  | A | A | A | A | C |
| Long-term adhesion |  | A | A | B | C | A |
| Processing suitability |  | A | A | A | C | A |

The materials and thickness of the substrate and the transparent resin layer used in each of Examples and Comparative Examples in the above Table 2 and Table 3 are as follows.

PO-1: Polypropylene resin sheet (propylene-ethylene random copolymer (ethylene content: 4.5% by mass or less), thickness: 80 μm, degree of crystallinity: 70%)

PO-2: Polypropylene resin sheet (propylene-ethylene random copolymer (ethylene content: 4.5% by mass or less), thickness: 60 μm, degree of crystallinity: 50%)

PO-3: Polypropylene resin sheet (propylene-ethylene random copolymer (ethylene content: 4.5% by mass or less), thickness: 60 μm, degree of crystallinity: 40%)

PO-4: Polypropylene resin sheet (propylene-ethylene random copolymer (ethylene content: 4.5% by mass or less), thickness: 100 μm, degree of crystallinity: 70%)

PVC1: polyvinyl chloride resin sheet (thickness: 120 μm)

PVC1 was prepared by extrusion-molding a resin composition in which 38 parts by mass of a phthalate plasticizer (undecylic phthalate (DUP)) was added based on 100 parts by mass of a polyvinyl chloride resin as a plasticizer.

PVC2: polyvinyl chloride resin sheet (thickness: 120 μm)

PVC2 was prepared in the same manner as in PVC1 except the plasticizer in PVC1 was changed to a polyester plasticizer (adipate polyester) and the content thereof was changed to 33 parts by mass based on 100 parts by mass of the polyvinyl chloride resin.

PO-A: Polypropylene resin (thickness: 80 μm)
PO-B: Polypropylene resin (thickness: 40 μm)
PO-C: Polypropylene resin (thickness: 100 μm)

The results of Table 2 can confirm that the decorative sheets of Example 1 to 8 have the excellent weatherability and inhibit the decrease of scratch resistance of the surface protective layer. These results also confirmed that these decorative sheets had a water vapor transmission rate of not less than 0.75 $g/m^2 \cdot 24$ h and not more than 45 $g/m^2 \cdot 24$ h and thus achieved the excellent application suitability, long-term adhesion, and processing characteristics.

The results of Table 3 also confirmed that the decorative sheets of Example 9 to 11, which used the predetermined radical scavengers and had a water vapor transmission rate of not less than 0.75 $g/m^2 \cdot 24$ h and not more than 45 $g/m^2 \cdot 24$ h, had the excellent application suitability, long-term adhesion, and processing characteristics in addition to the inhibition effects on the weatherability, the scratch resistance, and the bleed out. On the other hand, it was confirmed that the decorative sheet of Comparative Example 6, which had a water vapor transmission rate of more than 45 $g/m^2 \cdot 24$ h, failed to obtain excellent application characteristics and processing suitability, and the decorative sheet of Comparative Example 7, which had a water vapor transmission rate of less than 0.75 $g/m^2 \cdot 24$ h, failed to obtain excellent long-term adhesion.

INDUSTRIAL APPLICABILITY

The decorative sheet of the present invention has the excellent weatherability and can inhibit the decrease of scratch resistance of the surface protective layer, as well as which has excellent application suitability with a high initial tight contact strength in the application process, and achieves the excellent long-term adhesion free from the delamination even when used for a long term, and is therefore useful as a decorative sheet for the members used under the environment exposed to direct sunlight such as an exterior member such as a front door, and fittings such as a window frame and a door.

REFERENCE SIGNS LIST

100: decorative sheet
10: surface protective
20: primer layer

30: transparent resin layer
40: decorative layer
50: substrate

The invention claimed is:

1. A decorative sheet comprising:
a substrate; and
a surface protective layer on the substrate, wherein the surface protective layer is a layer obtained by cross-linking and curing a composition A containing an ionizing radiation-curable resin composition and a radical scavenger;
wherein:
the radical scavenger contains:
- a radical scavenger i which includes an ethylenic double bond polymerizable with the ionizing radiation-curable resin composition; and
- a radical scavenger ii which does not include an ethylenic double bond polymerizable with the ionizing radiation-curable resin composition;

a content of the radical scavenger in the composition A is not less than 0.5 parts by mass and less than 10.0 parts by mass based on 100 parts by mass of the ionizing radiation-curable resin composition; and
a water vapor transmission rate of the decorative sheet when measured in accordance with Testing Methods for Determination of the Water Vapor Transmission Rate of Moisture-Proof Packaging Materials (Dish Method) defined in JIS Z0208:1976 is not less than 0.75 $g/m^2 \cdot 24$ h and not more than 45 $g/m^2 \cdot 24h$.

2. The decorative sheet according to claim 1, wherein a mixing ratio on a mass basis of the radical scavenger i and the radical scavenger ii is 8:2 to 2:8.

3. The decorative sheet according to claim 1, wherein the radical scavenger i and the radical scavenger ii are each independently a hindered amine radical scavenger.

4. The decorative sheet according to claim 1, wherein the composition A further contains an ultraviolet absorber.

5. The decorative sheet according to claim 1, wherein the composition A further contains an antioxidant.

6. The decorative sheet according to claim 1, further comprising a primer layer in contact with the surface at the substrate side of the surface protective layer.

7. The decorative sheet according to claim 6, wherein the radical scavenger ii has a functional group reactable with a functional group in a structural component of the primer layer.

8. The decorative sheet according to claim 7, wherein the radical scavenger ii has a hydroxyl group, and the structural component of the primer layer has an isocyanate group.

9. The decorative sheet according to claim 1, further comprising a decorative layer between the substrate and the surface protective layer.

10. The decorative sheet according to claim 1, wherein the substrate contains titanium dioxide.

11. A decorative material comprising an adherend and the decorative sheet as described in claim 1.

12. The decorative material according to claim 11, further comprising an adhesive layer constituted by a urethane adhesive between the decorative sheet and the adherend.

13. The decorative material according to claim 12, wherein the urethane adhesive is a moisture curing adhesive.

14. The decorative material according to claim 11, wherein the adherend is a metal member or a resin member.

* * * * *